US012576623B2

(12) United States Patent
Liao et al.

(10) Patent No.: US 12,576,623 B2
(45) Date of Patent: Mar. 17, 2026

(54) PEARL PAPER STRUCTURE AND METHOD FOR MANUFACTURING THE SAME

(71) Applicant: NAN YA PLASTICS CORPORATION, Taipei (TW)

(72) Inventors: Te-Chao Liao, Taipei (TW); Hung-Yi Chang, Taipei (TW); Teng-Ko Ma, Taipei (TW); Wei-Tang Liao, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 205 days.

(21) Appl. No.: 18/610,225

(22) Filed: Mar. 19, 2024

(65) Prior Publication Data

US 2025/0214326 A1     Jul. 3, 2025

(30) Foreign Application Priority Data

Dec. 28, 2023    (TW) ................................. 112151187

(51) Int. Cl.
*B32B 27/08*        (2006.01)
*B29C 48/08*        (2019.01)
             (Continued)

(52) U.S. Cl.
CPC .............. *B32B 27/08* (2013.01); *B32B 27/20* (2013.01); *B32B 27/32* (2013.01); *B29C 48/08* (2019.02); *B29C 48/21* (2019.02); *B29K 2023/06* (2013.01); *B29K 2023/12* (2013.01); *B29K 2509/00* (2013.01); *B32B 2250/03* (2013.01); *B32B 2250/242* (2013.01);
             (Continued)

(58) Field of Classification Search
CPC ......... B32B 27/08; B32B 27/20; B32B 27/32; B32B 2250/03; B32B 2250/242; B32B 2250/40; B32B 2264/1022; B32B 2264/104; B32B 2270/00; B32B 2307/406; B32B 2307/538; B32B 2554/00; B29C 48/08; B29C 48/21; B29K 2023/06; B29K 2023/12; B29K 2509/00; Y10T 428/24355
See application file for complete search history.

(56) References Cited

U.S. PATENT DOCUMENTS

2002/0182391 A1    12/2002  Migliorini et al.
2015/0360449 A1*   12/2015  Larios ..................... B32B 5/022
                                                            428/213

FOREIGN PATENT DOCUMENTS

CN         1133535 C      1/2004
TW         201601920 A    1/2016
                  (Continued)

*Primary Examiner* — Donald M Flores, Jr.
(74) *Attorney, Agent, or Firm* — Li & Cai Intellectual Property Office

(57)         ABSTRACT
A pearl paper structure and a method for manufacturing the same are provided. The pearl paper structure includes a middle layer and a matte layer. The matte layer is disposed on the middle layer. A material of the matte layer includes a polyolefin material and fillers. The polyolefin material is formed by reacting a polypropylene, a polyethylene, and an initiator. Based on a total weight of the matte layer being 100 wt %, an amount of the polypropylene ranges from 20 wt % to 65 wt %, an amount of the polyethylene ranges from 30 wt % to 75 wt %, and an amount of the fillers ranges from 5 wt % to 10 wt %. An arithmetic average roughness of the matte layer ranges from 0.5 μm to 1.3 μm.

14 Claims, 1 Drawing Sheet

(51) Int. Cl.

| | | |
|---|---|---|
| *B29C 48/21* | (2019.01) | |
| *B29K 23/00* | (2006.01) | |
| *B29K 509/00* | (2006.01) | |
| *B32B 27/20* | (2006.01) | |
| *B32B 27/32* | (2006.01) | |

(52) U.S. Cl.
CPC ... *B32B 2250/40* (2013.01); *B32B 2264/1022* (2020.08); *B32B 2264/104* (2013.01); *B32B 2270/00* (2013.01); *B32B 2307/406* (2013.01); *B32B 2307/414* (2013.01); *B32B 2307/538* (2013.01); *B32B 2554/00* (2013.01); *Y10T 428/24355* (2015.01)

(56)            References Cited

FOREIGN PATENT DOCUMENTS

| TW | 201609412 A | 3/2016 |
|---|---|---|
| TW | 202015918 A | 5/2020 |

* cited by examiner

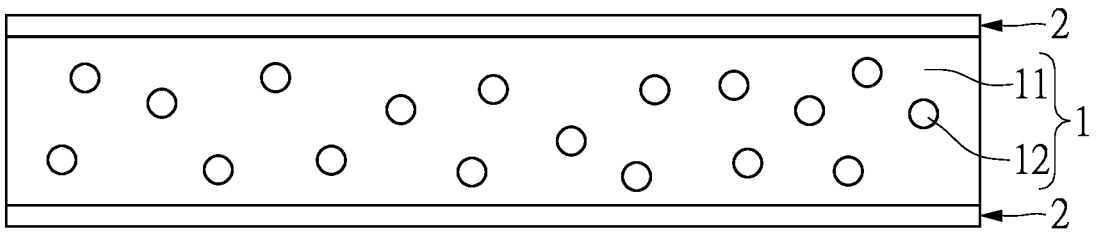

PEARL PAPER STRUCTURE AND METHOD FOR MANUFACTURING THE SAME

CROSS-REFERENCE TO RELATED PATENT APPLICATION

This application claims the benefit of priority to Taiwan Patent Application No. 112151187, filed on Dec. 28, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a pearl paper structure, and more particularly to a pearl paper structure that has a low surface roughness.

BACKGROUND OF THE DISCLOSURE

A pearl paper is a synthetic paper which is manufactured from petroleum synthetic resin. In comparison with normal paper made of wood-pulp, the pearl paper has a better water-proof property, a higher tearing strength, a smoother surface, but also has a higher density. Hence, the conventional pearl paper does not possess a lightweight characteristic.

Accordingly, some fillers, such as calcium carbonate or calcium silicate, are added to a raw material of the pearl paper for the purpose of lowering a density thereof. Since the fillers are incompatible with a resin material, some holes are formed on the resin material surrounding the fillers in a uniaxial extension process or a biaxial extension process due to stretching. Therefore, the density of the conventional pearl paper can be decreased.

However, some surficial holes are also formed on the surface of the conventional pearl paper due to an addition of the inorganic metal filler. As a result, a surface roughness of the conventional pearl paper is increased. In addition, during a production process, catalyst residues may sometimes remain in the resin material. In a high temperature environment, the polymer that surrounds the catalyst residues may continue to polymerize to form large molecules, resulting in uneven degree of polymerization throughout the resin material. Moreover, the large molecules may form crystal points, thereby decreasing printing efficiency of the pearl paper.

Therefore, how to improve the surface properties of the pearl paper to overcome the disadvantages mentioned above has become an important issue to be solved.

SUMMARY OF THE DISCLOSURE

In response to the above-referenced technical inadequacies, the present disclosure provides a pearl paper structure and a method for manufacturing the same.

In order to solve the above-mentioned problems, one of the technical aspects adopted by the present disclosure is to provide a pearl paper structure. The pearl paper structure includes a middle layer and a matte layer. The matte layer is disposed on the middle layer. A material of the matte layer includes a polyolefin material and fillers. The polyolefin material is formed by reacting a polypropylene, a polyethylene, and an initiator. Based on a total weight of the matte layer being 100 wt %, an amount of the polypropylene ranges from 20 wt % to 65 wt %, an amount of the polyethylene ranges from 30 wt % to 75 wt %, and an amount of the fillers ranges from 5 wt % to 10 wt %. An arithmetic average roughness of the matte layer ranges from 0.5 μm to 1.3 μm.

In one of the possible or preferred embodiments, a weight amount of the initiator in the matte layer ranges from 500 ppm to 2500 ppm.

In one of the possible or preferred embodiments, the initiator is selected from the group consisting of 2,5-dimethyl-2,5-di(tert-butylperoxy)hexane, di-tert-butyl peroxide, diisopropyl peroxide, acetyl peroxide, benzyl peroxide peroxide, and ethyl perbenzoate.

In one of the possible or preferred embodiments, a melting point of the polypropylene ranges from 155° C. to 165° C.

In one of the possible or preferred embodiments, a melting point of the polyethylene ranges from 115° C. to 125° C.

In one of the possible or preferred embodiments, a gloss of the matte layer ranges from 35% to 50%.

In one of the possible or preferred embodiments, a material of the middle layer includes a polypropylene.

In one of the possible or preferred embodiments, the pearl paper structure includes two layers of the matte layer, and the middle layer is disposed between the two layers of the matte layer.

In order to solve the above-mentioned problems, another one of the technical aspects adopted by the present disclosure is to provide a method for manufacturing a pearl paper structure. The method includes steps of: preparing a middle layer material and a matte layer material; and using the middle layer material and the matte layer material for a co-extrusion process to manufacture the pearl paper structure. The matte layer material includes a polypropylene, a polyethylene, fillers, and an initiator. In the co-extrusion process, the polypropylene, the polyethylene, and the initiator are reacted to form a polyolefin material. The pearl paper structure includes a middle layer formed from the middle layer material and a matte layer formed from the matte layer material, and the matte layer is disposed on the middle layer. An arithmetic average roughness of the matte layer ranges from 0.5 μm to 1.3 μm. Based on a total weight of the matte layer being 100 wt %, an amount of the polypropylene ranges from 20 wt % to 65 wt %, an amount of the polyethylene ranges from 30 wt % to 75 wt %, and an amount of the fillers ranges from 5 wt % to 10 wt %.

In one of the possible or preferred embodiments, a processing temperature for the matte layer material in the co-extrusion process ranges from 180° C. to 210° C.

In one of the possible or preferred embodiments, during the co-extrusion process, the initiator promotes a degradation reaction of the polypropylene and promotes a cross-linking reaction of the polyethylene, such that the polypropylene, the polyethylene, and the initiator are reacted to form the polyolefin material.

In one of the possible or preferred embodiments, a difference between a melting point of the polypropylene and a melting point of the polyethylene ranges from 30° C. to 50° C.

In one of the possible or preferred embodiments, a melting point of the polypropylene ranges from 155° C. to 165° C.

In one of the possible or preferred embodiments, a melting point of the polyethylene ranges from 115° C. to 125° C.

Therefore, in the pearl paper structure and the method for manufacturing the same provided by the present disclosure, by virtue of "a material of the matte layer including a polyolefin material and fillers" and "the polyolefin material being formed by reacting the polypropylene, the polyethylene, and the initiator," the pearl paper structure can have improved surface properties.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 1 is a schematic side view of a pearl paper structure according to the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure provides a pearl paper structure to overcome the inadequacies mentioned above. By adjusting the materials and the manufacturing steps, the pearl paper structure of the present disclosure can have a lower surface roughness. In addition, a formation of crystal points can be reduced in the polyolefin material of the present disclosure by adjusting the materials and the manufacturing steps, such that the pearl paper structure can have a better printability.

The pearl paper structure of the present disclosure includes a middle layer and a matte layer, and the matte layer is disposed on the middle layer. Specifically, the matte layer can be selectively disposed on one side or two sides of the middle layer so as to respectively form a single-side or a double-side pearl paper structure. Based on an overall thickness of the pearl paper structure being 100%, a thickness of the middle layer can range from 80% to 90%, and a thickness of the matte layer can range from 5% to 20%.

The middle layer is a main supporter of the pearl paper structure and enables the pearl paper structure to have a sufficient mechanical strength (e.g., stiffness) which facilitates subsequent processes. In addition, for convenience of use, the middle layer has a lower density (less than 0.65 $g/cm^3$), such that the pearl paper structure can have an advantage of the lightweight characteristic, but the present disclosure is not limited thereto.

The matte layer enables the pearl paper structure to have a good surface property. Therefore, the middle layer is completely covered by the matte layer without being exposed therefrom. Specifically, an arithmetic average roughness of the matte layer is less than 1.3 µm, and preferably ranges from 0.5 µm to 1.3 µm. A gloss of the matte layer is lower than 50%, and preferably ranges from 35% to 50%, but the present disclosure is not limited thereto.

Referring to FIG. 1, in an exemplary embodiment, the pearl paper structure is a three-layered structure. The pearl paper structure includes the middle layer 1 and two layers of the matte layer 2. The middle layer 1 is disposed between the two layers of the matte layer 2. The two surfaces of the middle layer 1 are completely covered by the two layers of the matte layer 2 without being exposed therefrom. Specific components in the middle layer 1 and the matte layer 2 are described later.

The middle layer 1 includes a continuous phase part 11 and a dispersed phase part 12. The dispersed phase part 12 is uniformly dispersed in the continuous phase part 11. Due to the dispersed phase part 12, the pearl paper structure can have a lightweight characteristic.

In an exemplary embodiment, the dispersed phase part 12 is uniformly dispersed in the continuous phase part 11 in a spherical shape, and the spherical shape has a size ranging from 1 µm to 2 µm. If the size of the continuous phase part 11 is too large, the three-layered structure may break during an elongation process, and fail to form a film. If the size of the continuous phase part 11 is too small, holes may not be formed in the middle layer 1 during the elongation process, so that the expected lightweight characteristic cannot be achieved.

Specifically, a material to form the continuous phase part 11 is polypropylene. The polypropylene can be a propylene homopolymer (PP-H), a propylene block copolymer (PP-B), a propylene random copolymer (PP-R), or a mixture thereof. In an exemplary embodiment, the propylene homopolymer is the material to form the continuous phase part 11, and the propylene homopolymer has a melting point ranging from 155° C. to 175° C. Preferably, the material to form the continuous phase part 11 has a melting point ranging from 160° C. to 165° C. The material to form the continuous phase part 11 has a melt flow index (MI) ranging from 3 g/10 min to 5 g/10 min. Preferably, the material to form the continuous phase part 11 has a melt flow index (MI) ranging from 3 g/10 min to 4 g/10 min.

Specifically, the material to form the dispersed phase part 12 can be organic fillers or inorganic fillers. When the dispersed phase part 12 is organic fillers, the dispersed phase part 12 can be polyester, such as polyethylene terephthalate (PET), polybutylene terephthalate (PBT), or a mixture thereof. When the dispersed phase part 12 is inorganic fillers, the dispersed phase part 12 can be selected from the group consisting of: titanium dioxide, silicon dioxide, calcium silicate, and calcium carbonate.

In an exemplary embodiment, the material to form the dispersed phase part 12 is an inorganic filler, and the inorganic filler is a mixture of titanium dioxide and calcium carbonate.

The matte layer 2 is disposed on the middle layer 1 and continuously formed on the middle layer 1. The term "continuously formed" indicates that the middle layer 1 is completely covered by the matte layer 2, so as to prevent the middle layer 1 from contacting the external environment. If the middle layer 1 is not completely covered by the matte layer 2, solvents used in the subsequent processes may permeate into the holes of the middle layer 2, thereby changing the size of the pearl paper structure and reducing the quality of the pearl paper structure.

In addition, if the middle layer 1 is not completely covered by the matte layer 2, the dispersed phase part 12 formed by the organic fillers or the inorganic fillers may separate from the continuous phase part 11, such that depowdering occurs on the surface of the pearl paper structure. As a result, the pearl paper structure may have a rough surface and a low quality.

The material to form the matte layer 2 includes a polyolefin material and fillers. The polyolefin material used as a continuous phase in the matte layer 2, and the fillers used as a dispersed phase and dispersed in the polyolefin material. It should be noted that the polyolefin material is formed by reacting a polypropylene, a polyethylene, and an initiator.

Under an appropriate temperature, free radicals are formed due to bond breaking of the initiator. The free radicals react with the polypropylene to form macroradical, and then the macroradical undergoes a β-cleavage reaction, which causes the polypropylene to undergo a degradation reaction. On the other hand, the free radicals react with the polyethylene to form macroradical, and then the two macroradicals will join together. That is, the polyethylene undergoes a crosslinking reaction.

From a macroscopic perspective, the polypropylene and the polyethylene can be mixed with each other in a continuous form. Whereas, from a microscopic perspective, the polypropylene and the polyethylene are still independent long molecules which are not integrally formed.

By adding the initiator, the polypropylene undergoes a degradation reaction, and the polyethylene undergoes a crosslinking reaction. When the degradation reaction of the polypropylene and the crosslinking reaction of the polyethylene simultaneously occur, the macroradical that are formed from the polypropylene and the macroradical that are formed from the polyethylene can react with each other to integrally form one molecule. In other words, after adding the initiator, the polypropylene and the polyethylene can further react with each other, and the component system will undergo very complicate reactions at a certain temperature.

Compared to a polyolefin material formed by directly mixing a polypropylene and a polyethylene or a polyolefin material formed by directly mixing a polypropylene, a polyethylene, and an initiator, the properties of the polyolefin material of the present disclosure are more uniform throughout the polyolefin material. In addition, when the polyolefin material of the present disclosure is used to form the matte layer 2, the matte layer 2 can have a lower roughness.

Furthermore, in order to avoid the formation of the crystal point caused by various molecular weight of the polyolefin material, the polypropylene, the polyethylene, and the initiator are chosen to be the materials in the present disclosure.

Since the polypropylene undergoes a degradation reaction, and the polyethylene undergoes a crosslinking reaction, a molecular weight of the polypropylene is controlled to be higher than a molecular weight of the polyethylene. In this way, the polypropylene being degraded and the polyethylene being cross-linked can have similar molecular weights, thereby avoiding the formation of the crystal point.

As mentioned above, the component system is very complicated. Hence, the properties of the polypropylene and the polyethylene that are described are those exhibited before the degradation reaction or the crosslinking reaction.

A melting point of the polypropylene ranges from 155° C. to 165° C. Specifically, the melting point of the polypropylene can be 156° C., 158° C., 160° C., 162° C., or 164° C. A melt flow index of the polypropylene ranges from 3 g/10 min to 5 g/10 min.

Specifically, the polypropylene can be a propylene homopolymer (PP-H), a propylene block copolymer (PP-B), a propylene random copolymer (PP-R), or a mixture thereof. Preferably, the polypropylene is the propylene homopolymer.

A melting point of the polyethylene ranges from 115° C. to 125° C. Specifically, the melting point of the polyethylene can be 116° C., 118° C., 120° C., 122° C., or 124° C. A melt flow index of the polyethylene ranges from 1 g/10 min to 3 g/10 min.

Specifically, the polyethylene can be an ethylene homopolymer (PE-H), an ethylene block copolymer (PE-B), an ethylene random copolymer (PE-R), or a mixture thereof. Preferably, the polypropylene is the ethylene homopolymer.

Specifically, the initiator can be a peroxide. The initiator can be selected from the group consisting of: 2,5-dimethyl-2,5-di(tert-butylperoxy)hexane, di-tert-butyl peroxide, diisopropyl peroxide, acetyl peroxide, benzyl peroxide, and ethyl perbenzoate. Preferably, the initiator is 2,5-dimethyl-2,5-di (tert-butylperoxy) hexane or diisopropyl peroxide.

Based on a total weight of the matte layer 2 being 100 wt %, an amount of the polypropylene ranges from 20 wt % to 65 wt %, such as 25 wt %, 30 wt %, 35 wt %, 40 wt %, 45 wt %, 50 wt %, 55 wt %, or 60 wt %.

Based on the total weight of the matte layer 2 being 100 wt %, an amount of the polyethylene ranges from 30 wt % to 75 wt %, such as 35 wt %, 40 wt %, 45 wt %, 50 wt %, 55 wt %, 60 wt %, 65 wt %, or 70 wt %.

Based on the total weight of the matte layer 2 being 100 wt %, an amount of the fillers ranges from 5 wt % to 10 wt %, such as 6 wt % or 8 wt %.

A weight amount of the initiator in the matte layer 2 can range from 500 ppm to 2500 ppm, such as 600 ppm, 800 ppm, 1000 ppm, 1200 ppm, 1400 ppm, 1600 ppm, 1800 ppm, 2000 ppm, 2200 ppm, or 2400 ppm.

In an exemplary embodiment, the amount of the polyethylene is higher than the amount of the polypropylene, such that the polyethylene can be reacted with the polypropylene during the crosslinking reaction to form the polyolefin material of the present disclosure.

Specifically, the amount of the polypropylene can range from 20 wt % to 45 wt %, the amount of the polyethylene can range from 50 wt % to 75 wt %, and the amount of the fillers can range from 5 wt % to 10 wt %. The weight amount of the initiator in the matte layer 2 can range from 800 ppm to 2000 ppm.

In addition to components mentioned above, the material to form the matte layer 2 can further include antioxidant and rheology additive, but the present disclosure is not limited thereto.

The antioxidant can be a hindered phenol antioxidant, a phosphite antioxidant, or a combination thereof. A weight amount of the antioxidant in the matte layer 2 can range from 500 ppm to 3000 ppm. Preferably, the antioxidant can be a combination of the hindered phenol antioxidant and the phosphite antioxidant.

The rheology additive can be a silicone oil, a paraffin, an organosilicon compound, or a combination thereof. A weight amount of the rheology additive in the matte layer 2 can range from 3000 ppm to 5000 ppm. Preferably, the rheology additive can be the paraffin.

Experimental Data

In order to prove that the pearl paper structure of the present disclosure have a lower roughness, a middle layer material and a matte layer material listed in Table 1 are prepared. The middle layer material and the matte layer material are put in a co-extruder for a co-extrusion process to form a composite membrane (including the matte layer material/the middle layer material/the matte layer material).

matte layer 2. A total thickness of the pearl paper structure is 100 μm, in which a thickness of the middle layer 1 is 80 μm, and a thickness of the single matte layer 2 is 10 μm.

It should be noted that the middle layer material and the matte layer material are respectively extruded under different processing temperature. Specifically, the middle layer material is extruded under a processing temperature ranging from 220° C. to 250° C., and the matte layer material is extruded under a processing temperature ranging from 180° C. to 250° C. During the co-extrusion process, the polypropylene, the polyethylene, and the initiator in the matte layer material are reacted to form the polyolefin material.

During the extending process, an extension ratio of the composite membrane in a mechanical direction (MD) is 6 times, an extension ratio of the composite membrane in a transverse direction (TD) is 8 times, but the present disclosure is not limited thereto.

An arithmetic average roughness (Ra) of the pearl paper structure is measured by a roughometer (brand: Testing Machines Inc.; model: 58-06-00-001) according to the TAPPI T-555 standard. A gloss of the pearl paper structure is measured by a glossmeter (brand: Byk-Gardner GmbH) according to the TAPPI T-480 standard. A haze the pearl paper structure is measured by a hazer (brand: Tokyo Denshoku; model: TC-HIII) according to the ASTM D-1003 standard. The results are listed in Table 2.

TABLE 1

| | (phr) | Example 1 | Example 2 | Example 3 | Comparative Example 1 |
|---|---|---|---|---|---|
| Matte layer material | Polyolefin material | Polypropylene | 35 | 35 | 35 | 35 |
| | | Polyethylene | 55 | 55 | 55 | 55 |
| | | Diisopropyl peroxide | 1000 ppm | — | 1000 ppm | — |
| | | 2,5-dimethyl-2,5-di(tert-butylperoxy)hexane | — | 1500 ppm | — | — |
| | Antioxidant | | 2000 ppm | 2000 ppm | 2000 ppm | 2000 ppm |
| | Rheology additive | | 3000 ppm | 3000 ppm | 3000 ppm | 3000 ppm |
| | Titanium dioxide | | 10 | 10 | 10 | 10 |
| | Processing temperature | | 200° C. | 200° C. | 240° C. | 200° C. |
| Middle layer material | Polypropylene | | 100 | 100 | 100 | 100 |
| | Titanium dioxide | | 6 | 6 | 6 | 6 |
| | Calcium carbonate | | 15 | 15 | 15 | 15 |
| | Processing temperature | | 240° C. | 240° C. | 240° C. | 240° C |
| Matte layer material | Polyolefin material | Polypropylene | 35 | 35 | 35 | 35 |
| | | Polyethylene | 55 | 55 | 55 | 55 |
| | | Diisopropyl peroxide | 1000 ppm | — | 1000 ppm | — |
| | | 2,5-dimethyl-2,5-di(tert-butylperoxy)hexane | — | 1500 ppm | — | — |
| | Antioxidant | | 2000 ppm | 2000 ppm | 2000 ppm | 2000 ppm |
| | Rheology additive | | 3000 ppm | 3000 ppm | 3000 ppm | 3000 ppm |
| | Titanium dioxide | | 10 | 10 | 10 | 10 |
| | Processing temperature | | 200° C. | 200° C. | 240° C. | 200° C. |

The composite membrane is implemented by an extending process so as to form the pearl paper structure of Examples 1 to 3 and Comparative Example 1 as shown in FIG. 1.

In the Examples 1 to 3 and Comparative Example 1, the middle layer material is used to form the middle layer 1, and the matte layer material is used to form the matte layer 2. The middle layer 1 is disposed between the two layers of the

TABLE 2

| | Example 1 | Example 2 | Example 3 | Comparative Example 1 |
|---|---|---|---|---|
| Total thickness (μm) | 100 | 100 | 100 | 100 |
| Surface roughness (μm) | 0.6 | 0.8 | 1.1 | 2.5 |

TABLE 2-continued

|  | Example 1 | Example 2 | Example 3 | Comparative Example 1 |
|---|---|---|---|---|
| Gloss (%) | 37 | 39 | 45 | 21 |
| Haze (%) | 72 | 75 | 81 | 66 |

According to the results of Table 1 and Table 2, the pearl paper structure can have a lower surface roughness by using the polyolefin material reacted from the polypropylene, the polyethylene, and the initiator as the matte layer material. The effect can be achieved by merely mixing the polypropylene and the polyethylene (Comparative Example 1).

Specifically, the surface roughness of the matte layer can be lower than 1.3 μm, preferably ranging from 0.5 μm to 1.3 μm. Moreover, the pearl paper structure of the present disclosure can have a low gloss (lower than or equal to 50%).

Besides the materials, the surface roughness of the matte layer will also be influenced by the processing temperature in the co-extrusion process. When the processing temperature ranges from 180° C. to 250° C. (Examples 1 to 3), the matte layer can have the surface roughness ranging from 0.5 μm to 1.3 μm. When the processing temperature ranges from 180° C. to 210° C. (Examples 1 and 2), the matte layer can have the surface roughness ranging from 0.5 μm to 1.0 μm.

Beneficial Effects of the Embodiments

In conclusion, in the pearl paper structure and the method for manufacturing the same provided by the present disclosure, by virtue of "a material of the matte layer including a polyolefin material and fillers" and "the polyolefin material being formed by reacting the polypropylene, the polyethylene, and the initiator," the pearl paper structure can have improved surface properties.

Further, properties of the polyolefin material are also influenced by the processing temperature. In order to lower the surface roughness of the matte layer, the processing temperature for the matte layer material can range from 180° C. to 250° C., and preferably from 180° C. to 210° C.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A pearl paper structure, comprising:
a middle layer; and
a matte layer disposed on the middle layer, wherein a material of the matte layer includes a polyolefin material and fillers; wherein the polyolefin material is formed by reacting a polypropylene, an polyethylene, and an initiator; wherein, based on a total weight of the matte layer being 100 wt %, an amount of the polypropylene ranges from 20 wt % to 65 wt %, an amount of the polyethylene ranges from 30 wt % to 75 wt %, and an amount of the fillers ranges from 5 wt % to 10 wt %;
wherein an arithmetic average roughness of the matte layer ranges from 0.5 μm to 1.3 μm.

2. The pearl paper structure according to claim 1, wherein a weight amount of the initiator in the matte layer ranges from 500 ppm to 2500 ppm.

3. The pearl paper structure according to claim 1, wherein the initiator is selected from the group consisting of 2,5-dimethyl-2,5-di (tert-butylperoxy) hexane, di-tert-butyl peroxide, diisopropyl peroxide, acetyl peroxide, benzyl peroxide peroxide, and ethyl perbenzoate.

4. The pearl paper structure according to claim 1, wherein a melting point of the polypropylene ranges from 155° C. to 165° C.

5. The pearl paper structure according to claim 1, wherein a melting point of the polyethylene ranges from 115° C. to 125° C.

6. The pearl paper structure according to claim 1, wherein a gloss of the matte layer ranges from 35% to 50%.

7. The pearl paper structure according to claim 1, wherein a material of the middle layer includes a polypropylene.

8. The pearl paper structure according to claim 1, wherein the pearl paper structure includes two layers of the matte layer, and the middle layer is disposed between the two layers of the matte layer.

9. A method for manufacturing a pearl paper structure, comprising:
preparing a middle layer material and a matte layer material; wherein the matte layer material includes a polypropylene, a polyethylene, fillers, and an initiator; and
using the middle layer material and the matte layer material for a co-extrusion process to manufacture the pearl paper structure; wherein, in the co-extrusion process, the polypropylene, the polyethylene, and the initiator are reacted to form a polyolefin material;
wherein the pearl paper structure includes a middle layer formed from the middle layer material and a matte layer formed from the matte layer material, the matte layer is disposed on the middle layer, and an arithmetic average roughness of the matte layer ranges from 0.5 μm to 1.3 μm;
wherein, based on a total weight of the matte layer being 100 wt %, an amount of the polypropylene ranges from 20 wt % to 65 wt %, an amount of the polyethylene ranges from 30 wt % to 75 wt %, and an amount of the fillers ranges from 5 wt % to 10 wt %.

10. The method according to claim 9, wherein a processing temperature for the matte layer material in the co-extrusion process ranges from 180° C. to 210° C.

11. The method according to claim 9, wherein, during the co-extrusion process, the initiator promotes a degradation reaction of the polypropylene and promotes a crosslinking reaction of the polyethylene, such that the polypropylene, the polyethylene, and the initiator are reacted to form the polyolefin material.

12. The method according to claim 9, wherein a difference between a melting point of the polypropylene and a melting point of the polyethylene ranges from 30° C. to 50° C.

13. The method according to claim 9, wherein a melting point of the polypropylene ranges from 155° C. to 165° C.

14. The method according to claim 9, wherein a melting point of the polyethylene ranges from 115° C. to 125° C.

* * * * *